US011461010B2

(12) United States Patent
Choi et al.

(10) Patent No.: US 11,461,010 B2
(45) Date of Patent: Oct. 4, 2022

(54) DATA PROPERTY-BASED DATA PLACEMENT IN A NONVOLATILE MEMORY DEVICE

(71) Applicant: Samsung Electronics Co., Ltd., Gyeonggi-do (KR)

(72) Inventors: Changho Choi, San Jose, CA (US); Jianjian Huo, San Jose, CA (US); Derrick Tseng, Union City, CA (US); Praveen Krishnamoorthy, Sunnyvale, CA (US); Hingkwan Huen, Daly City, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/144,588

(22) Filed: May 2, 2016

(65) Prior Publication Data
US 2017/0017411 A1    Jan. 19, 2017

Related U.S. Application Data

(60) Provisional application No. 62/192,045, filed on Jul. 13, 2015, provisional application No. 62/245,100, filed on Oct. 22, 2015.

(51) Int. Cl.
*G06F 12/00* (2006.01)
*G06F 13/00* (2006.01)
(Continued)

(52) U.S. Cl.
CPC ............ *G06F 3/0611* (2013.01); *G06F 3/064* (2013.01); *G06F 3/0688* (2013.01);
(Continued)

(58) Field of Classification Search
CPC .... G06F 3/0611; G06F 3/0647; G06F 3/0653; G06F 3/0688; G06F 12/0246;
(Continued)

(56) References Cited

U.S. PATENT DOCUMENTS 4,641,197 A * 2/1987 Miyagi ................ G06T 1/0007
358/450
4,827,411 A * 5/1989 Arrowood ............... H04L 29/00
(Continued)

FOREIGN PATENT DOCUMENTS

CN    101646995 A    2/2010
CN    101237511       8/2010
(Continued)

OTHER PUBLICATIONS

"Improving Flash Write Performance by Using Update Frequency," Radu Stoica and Anastasia Allamaki, The 39th International Conference on Very Large Data Bases, Aug. 26-30, 2013, Riva del Garda, Trento, Italy; Proceedings of the VLDB Endowment, vol. 6, No. 9, Copyright 2013 VLDB.
(Continued)

*Primary Examiner* — Sheng Jen Tsai
(74) *Attorney, Agent, or Firm* — Lewis Roca Rothgerber Christie LLP

(57) ABSTRACT

Example embodiments are described for data property-based data placement inside a nonvolatile memory device performed by a storage controller of the nonvolatile memory device. In one aspect, the embodiments include: executing a software component on the computer device that detects at least one of an executing application and a hardware device connecting to the computing device; responsive to detecting the at least one executing application and the hardware device, searching, by the software component, a workflow repository to find a predetermined workflow associated with
(Continued)

the at least one executing application and the hardware device, wherein the predetermined workflow associates predefined data property identifiers to different types of data items written to the nonvolatile memory device by the executing application or the hardware device; comparing, by the software component, activities of the at least one executing application and the hardware device to the predetermined workflow; and using the predetermined workflow to automatically assign the data property identifiers to the data items used by the application or the hardware device, such that the data items and assigned data property identifiers are transmitted over a channel to the nonvolatile memory device for storage wherein the nonvolatile memory device reads the data property identifiers and identifies which blocks of the nonvolatile memory device to store the corresponding data items, such that the data items having the same data property identifiers are stored in a same block.

23 Claims, 7 Drawing Sheets

(51) Int. Cl.
  *G06F 3/06* (2006.01)
  *G06F 12/02* (2006.01)
(52) U.S. Cl.
  CPC .. *G06F 12/0246* (2013.01); *G06F 2212/1016* (2013.01); *G06F 2212/7202* (2013.01); *G06F 2212/7205* (2013.01)
(58) Field of Classification Search
  CPC ............... G06F 12/0253; G06F 13/18; G06F 17/30353; G06F 2212/1016; G06F 2212/1036; G06F 2212/702; G06F 2212/7201; G06F 2212/7202; G06F 2212/7205
  USPC ........................................................ 711/103
  See application file for complete search history.

(56) References Cited

U.S. PATENT DOCUMENTS

| | | | |
|---|---|---|---|
| 5,930,497 A | 7/1999 | Cherian et al. | |
| 6,282,663 B1* | 8/2001 | Khazam | G06F 1/32 713/320 |
| 6,438,555 B1* | 8/2002 | Orton | G06F 16/30 |
| 6,484,235 B1 | 11/2002 | Horst | |
| 6,920,331 B1* | 7/2005 | Sim | H04W 4/14 370/474 |
| 7,660,264 B1 | 2/2010 | Eiriksson et al. | |
| 7,853,759 B2 | 12/2010 | Sadovsky | |
| 7,870,128 B2 | 1/2011 | Jensen | |
| 7,962,638 B2 | 6/2011 | Cherkauer | |
| 7,970,806 B2 | 6/2011 | Park et al. | |
| 8,112,813 B1* | 2/2012 | Goodwin | G06F 21/10 726/27 |
| 8,312,217 B2 | 11/2012 | Chang et al. | |
| 8,495,035 B2* | 7/2013 | Aharonov | G06F 21/64 707/687 |
| 8,566,513 B2 | 10/2013 | Yamashita | |
| 8,615,703 B2 | 12/2013 | Eisenhuth | |
| 8,738,882 B2 | 5/2014 | Post et al. | |
| 8,837,287 B2 | 9/2014 | Dolganow et al. | |
| 8,838,877 B2 | 9/2014 | Wakrat et al. | |
| 8,874,835 B1* | 10/2014 | Davis | G06F 3/0679 711/103 |
| 8,996,450 B1 | 3/2015 | Rubio | |
| 9,003,159 B2 | 4/2015 | Deshkar et al. | |
| 9,015,311 B2 | 4/2015 | Muniraja | |
| 9,021,185 B2 | 4/2015 | Ban | |
| 9,042,181 B2 | 5/2015 | Flynn et al. | |
| 9,158,770 B1* | 10/2015 | Beadles | H04L 67/02 |
| 9,176,864 B2 | 11/2015 | Gorobets et al. | |
| 9,183,136 B2 | 11/2015 | Kawamura et al. | |
| 9,201,804 B1 | 12/2015 | Egyed | |
| 9,213,633 B2 | 12/2015 | Canepa et al. | |
| 9,280,466 B2 | 3/2016 | Kunimatsu | |
| 9,286,204 B2 | 3/2016 | Kikkawa | |
| 9,330,305 B2* | 5/2016 | Zhao | G06K 9/00369 |
| 9,413,587 B2* | 8/2016 | Smith | H04L 29/08117 |
| 9,436,634 B2 | 9/2016 | Canepa et al. | |
| 9,495,102 B2 | 11/2016 | Bisht | |
| 9,521,201 B2 | 12/2016 | Ori | |
| 9,563,397 B1 | 2/2017 | Stoev et al. | |
| 9,575,981 B2* | 2/2017 | Dorman | G06F 16/168 |
| 9,892,041 B1* | 2/2018 | Banerjee | G06F 16/128 |
| 10,091,421 B2 | 10/2018 | Wakazono | |
| 10,776,007 B2 | 9/2020 | Kunimatsu | |
| 2001/0016068 A1* | 8/2001 | Shibata | G06F 17/2247 382/195 |
| 2002/0011431 A1* | 1/2002 | Graef | G06Q 20/042 209/534 |
| 2002/0032027 A1* | 3/2002 | Kirani | G06T 9/007 455/412.1 |
| 2002/0059317 A1* | 5/2002 | Black | G06F 16/10 |
| 2002/0081040 A1* | 6/2002 | Uchida | G06T 11/60 382/311 |
| 2002/0103860 A1* | 8/2002 | Terada | G06Q 30/02 709/203 |
| 2003/0055747 A1* | 3/2003 | Carr | G06Q 30/06 705/26.1 |
| 2003/0120952 A1* | 6/2003 | Tarbotton | G06F 21/564 726/4 |
| 2004/0098541 A1 | 5/2004 | Megiddo et al. | |
| 2005/0078944 A1* | 4/2005 | Risan | G06F 21/10 386/213 |
| 2005/0165777 A1* | 7/2005 | Hurst-Hiller | G06F 16/2471 |
| 2006/0070030 A1 | 3/2006 | Laborczfalvi | |
| 2006/0168517 A1* | 7/2006 | Itoh | H04N 7/163 715/243 |
| 2006/0242076 A1* | 10/2006 | Fukae | H04L 63/10 705/57 |
| 2006/0287973 A1 | 12/2006 | Kageyama et al. | |
| 2007/0016754 A1 | 1/2007 | Testardi | |
| 2007/0050777 A1* | 3/2007 | Hutchinson | G06F 11/0709 718/104 |
| 2007/0156998 A1 | 7/2007 | Gorobets | |
| 2007/0225962 A1* | 9/2007 | Brunet | G06F 11/1451 703/23 |
| 2007/0226443 A1 | 9/2007 | Giampaolo | |
| 2008/0071970 A1 | 3/2008 | Lin | |
| 2008/0183918 A1 | 7/2008 | Dhokia et al. | |
| 2008/0187345 A1* | 8/2008 | Sorihashi | G03G 15/161 399/83 |
| 2008/0250190 A1* | 10/2008 | Johnson | G06F 3/0481 711/103 |
| 2008/0263259 A1 | 10/2008 | Sadovsky et al. | |
| 2008/0263579 A1* | 10/2008 | Mears | G11B 27/322 725/9 |
| 2009/0024808 A1 | 1/2009 | Hillier, III et al. | |
| 2009/0222617 A1 | 9/2009 | Yano et al. | |
| 2009/0323022 A1* | 12/2009 | Uchida | A61B 3/12 351/206 |
| 2010/0017487 A1 | 1/2010 | Patinkin | |
| 2010/0030822 A1* | 2/2010 | Dawson | G06F 11/1469 707/E17.044 |
| 2010/0146538 A1* | 6/2010 | Cheong | H04N 21/235 725/31 |
| 2010/0288828 A1* | 11/2010 | Pradhan | G06F 3/002 235/375 |
| 2011/0066790 A1 | 3/2011 | Mogul | |
| 2011/0106780 A1* | 5/2011 | Martinez Heras | G06F 16/90348 707/705 |
| 2011/0115924 A1* | 5/2011 | Yu | G06F 1/1605 348/207.11 |

(56) References Cited

U.S. PATENT DOCUMENTS

| | | | |
|---|---|---|---|
| 2011/0145499 A1* | 6/2011 | Ananthanarayanan | G06F 12/0866 711/118 |
| 2011/0167221 A1* | 7/2011 | Pangal | G06F 11/1453 711/117 |
| 2011/0221864 A1* | 9/2011 | Filippini | H04N 19/40 348/43 |
| 2011/0246706 A1 | 10/2011 | Gomyo | |
| 2011/0276539 A1* | 11/2011 | Thiam | G06F 11/1448 707/634 |
| 2012/0007952 A1* | 1/2012 | Otsuka | H04N 5/9205 348/46 |
| 2012/0042134 A1* | 2/2012 | Risan | G06F 21/10 711/154 |
| 2012/0047330 A1 | 2/2012 | Rago | |
| 2012/0054447 A1 | 3/2012 | Swart | |
| 2012/0060013 A1* | 3/2012 | Mukherjee | G06F 11/3471 711/204 |
| 2012/0072662 A1 | 3/2012 | Jess et al. | |
| 2012/0072798 A1 | 3/2012 | Unesaki et al. | |
| 2012/0096217 A1* | 4/2012 | Son | G06F 12/0246 711/103 |
| 2012/0131304 A1 | 5/2012 | Franceschini | |
| 2012/0150917 A1* | 6/2012 | Sundaram | G06F 16/2379 707/803 |
| 2012/0158827 A1* | 6/2012 | Mathews | H04L 12/6418 709/203 |
| 2012/0191900 A1 | 7/2012 | Kunimatsu | |
| 2012/0239869 A1 | 9/2012 | Chiueh | |
| 2012/0254524 A1 | 10/2012 | Fujimoto | |
| 2012/0278532 A1 | 11/2012 | Bolanowski | |
| 2012/0317337 A1* | 12/2012 | Johar | G06F 12/0246 711/103 |
| 2012/0323977 A1 | 12/2012 | Fortier et al. | |
| 2013/0013889 A1 | 1/2013 | Devaraj et al. | |
| 2013/0019109 A1* | 1/2013 | Kang | G06F 21/10 713/193 |
| 2013/0019310 A1* | 1/2013 | Ben-Itzhak | G06F 21/52 726/23 |
| 2013/0024483 A1* | 1/2013 | Mohr | G06F 16/27 707/822 |
| 2013/0024559 A1 | 1/2013 | Susanta et al. | |
| 2013/0024599 A1* | 1/2013 | Huang | G06F 3/0611 711/102 |
| 2013/0050743 A1* | 2/2013 | Steely | G06K 15/405 358/1.15 |
| 2013/0097207 A1* | 4/2013 | Sassa | G06F 16/51 707/803 |
| 2013/0111336 A1* | 5/2013 | Dorman | G06F 9/4843 715/255 |
| 2013/0111547 A1* | 5/2013 | Kraemer | G06F 21/552 726/1 |
| 2013/0159626 A1* | 6/2013 | Katz | G06F 3/0608 711/119 |
| 2013/0166856 A1 | 6/2013 | Lim et al. | |
| 2013/0183951 A1* | 7/2013 | Chien | H04W 4/50 455/418 |
| 2013/0262533 A1 | 10/2013 | Mitra et al. | |
| 2013/0279395 A1 | 10/2013 | Aramoto et al. | |
| 2013/0290601 A1* | 10/2013 | Sablok | G06F 12/0246 711/103 |
| 2013/0304944 A1* | 11/2013 | Young | G06F 9/4415 710/16 |
| 2013/0326169 A1 | 12/2013 | Shaharabany et al. | |
| 2014/0019701 A1 | 1/2014 | Ohira et al. | |
| 2014/0049628 A1* | 2/2014 | Motomura | G02B 21/367 348/77 |
| 2014/0052953 A1 | 2/2014 | Ben-Tsion | |
| 2014/0074899 A1 | 3/2014 | Halevy | |
| 2014/0089545 A1 | 3/2014 | Samanta et al. | |
| 2014/0156913 A1 | 6/2014 | Chiang | |
| 2014/0181499 A1 | 6/2014 | Glod | |
| 2014/0195921 A1* | 7/2014 | Grosz | G06F 3/1242 715/738 |
| 2014/0208007 A1 | 7/2014 | Cohen et al. | |
| 2014/0215129 A1 | 7/2014 | Kuzmin et al. | |
| 2014/0281158 A1* | 9/2014 | Ravimohan | G06F 12/0246 711/103 |
| 2014/0281172 A1 | 9/2014 | Seo | |
| 2014/0281302 A1 | 9/2014 | Horn | |
| 2014/0289492 A1 | 9/2014 | Ranjith Reddy | |
| 2014/0304469 A1 | 10/2014 | Wu | |
| 2014/0333790 A1* | 11/2014 | Wakazono | H04N 5/23241 348/222.1 |
| 2015/0026257 A1* | 1/2015 | Balakrishnan | H04N 21/233 709/204 |
| 2015/0058790 A1 | 2/2015 | Kim et al. | |
| 2015/0074337 A1 | 3/2015 | Jo | |
| 2015/0113652 A1* | 4/2015 | Ben-Itzhak | G06F 21/52 726/24 |
| 2015/0146259 A1* | 5/2015 | Enomoto | H04N 1/32112 358/1.16 |
| 2015/0149605 A1 | 5/2015 | de la Iglesia et al. | |
| 2015/0169449 A1 | 6/2015 | Barrell | |
| 2015/0186648 A1* | 7/2015 | Lakhotia | G06F 21/563 726/22 |
| 2015/0188960 A1* | 7/2015 | Alhaidar | H04L 65/4076 709/204 |
| 2015/0278699 A1 | 10/2015 | Danielsson | |
| 2015/0309742 A1 | 10/2015 | Amidi et al. | |
| 2015/0324300 A1 | 11/2015 | Sampathkumar et al. | |
| 2016/0042005 A1 | 2/2016 | Liu et al. | |
| 2016/0048445 A1* | 2/2016 | Gschwind | G06F 8/443 717/130 |
| 2016/0070819 A1* | 3/2016 | Soderberg | G06F 16/27 707/694 |
| 2016/0078245 A1* | 3/2016 | Amarendran | G06F 16/164 713/193 |
| 2016/0094603 A1* | 3/2016 | Liao | H04L 65/60 709/204 |
| 2016/0139838 A1 | 5/2016 | D'Sa et al. | |
| 2016/0139927 A1 | 5/2016 | Gschwind et al. | |
| 2016/0170639 A1 | 6/2016 | Velayudhan et al. | |
| 2016/0170873 A1 | 6/2016 | Uchigaito | |
| 2016/0179386 A1 | 6/2016 | Zhang | |
| 2016/0179678 A1 | 6/2016 | Camp et al. | |
| 2016/0196076 A1* | 7/2016 | Oh | G06F 12/0246 711/103 |
| 2016/0197950 A1* | 7/2016 | Tsai | H04L 63/1425 713/156 |
| 2016/0203053 A1 | 7/2016 | Talagala et al. | |
| 2016/0203197 A1* | 7/2016 | Rastogi | G06F 16/2308 707/602 |
| 2016/0219024 A1* | 7/2016 | Verzun | H04L 63/102 |
| 2016/0239615 A1* | 8/2016 | Dorn | G16H 10/60 |
| 2016/0266792 A1* | 9/2016 | Amaki | G06F 12/0246 |
| 2016/0283116 A1 | 9/2016 | Ramalingam | |
| 2016/0283124 A1 | 9/2016 | Hashimoto et al. | |
| 2016/0283125 A1* | 9/2016 | Hashimoto | G06F 16/166 |
| 2016/0306552 A1 | 10/2016 | Liu et al. | |
| 2016/0313943 A1* | 10/2016 | Hashimoto | G06F 16/00 |
| 2016/0328156 A1 | 11/2016 | Swarbrick et al. | |
| 2016/0357437 A1 | 12/2016 | Doerner | |
| 2017/0017663 A1* | 1/2017 | Huo | G06F 3/0619 |
| 2017/0024141 A1 | 1/2017 | Davis et al. | |
| 2017/0039372 A1* | 2/2017 | Koval | G01D 4/004 |
| 2017/0109096 A1 | 4/2017 | Jean | |
| 2017/0123666 A1 | 5/2017 | Sinclair | |
| 2017/0161100 A1 | 6/2017 | Rashid et al. | |
| 2017/0228157 A1 | 8/2017 | Yang et al. | |
| 2017/0300426 A1 | 10/2017 | Chai et al. | |
| 2017/0308722 A1 | 10/2017 | Oikawa et al. | |
| 2017/0308772 A1 | 10/2017 | Li | |
| 2017/0339230 A1* | 11/2017 | Yeom | G06F 16/178 |
| 2017/0344470 A1 | 11/2017 | Yang et al. | |
| 2018/0012032 A1* | 1/2018 | Radich | H04L 9/14 |
| 2018/0074700 A1 | 3/2018 | Tsalmon et al. | |
| 2019/0138221 A1 | 5/2019 | Huang | |

(56) References Cited

U.S. PATENT DOCUMENTS

FOREIGN PATENT DOCUMENTS

| CN | 102934171 A | 2/2013 |
|---|---|---|
| CN | 103324703 | 9/2013 |
| CN | 103597444 | 2/2014 |
| CN | 103620549 A | 3/2014 |
| CN | 103703450 A | 4/2014 |
| CN | 103842962 A | 6/2014 |
| CN | 103942010 A | 7/2014 |
| CN | 104021009 A | 9/2014 |
| CN | 104111898 A | 10/2014 |
| CN | 104159021 A | 11/2014 |
| CN | 104391569 | 3/2015 |
| CN | 104423800 A | 3/2015 |
| CN | 104572491 A | 4/2015 |
| CN | 103777905 | 4/2017 |
| CN | 103677654 | 3/2018 |
| EP | 1229721 | 8/2002 |
| EP | 2884396 A1 | 6/2015 |
| JP | 2-302855 A | 12/1990 |
| JP | 11-327978 A | 11/1999 |
| JP | 2006235960 | 9/2006 |
| JP | 2007102998 | 4/2007 |
| JP | 2007172447 | 7/2007 |
| JP | 2011-186562 A | 9/2011 |
| JP | 2012-104974 A | 5/2012 |
| JP | WO2012/104974 A1 | 8/2012 |
| JP | 2012-170751 A | 9/2012 |
| JP | 2012020544 | 10/2013 |
| JP | 2014-167790 A | 9/2014 |
| JP | 2014-522537 A | 9/2014 |
| JP | 2015-8358 A | 1/2015 |
| JP | WO2015/008358 A1 | 1/2015 |
| JP | 5723812 | 5/2015 |
| JP | 5723812 B2 | 5/2015 |
| KR | 10-2014-0033099 A | 3/2014 |
| KR | 10-2014-0094468 A | 7/2014 |
| KR | 10-2014-0112303 A | 9/2014 |
| KR | 10-1544309 B1 | 8/2015 |
| WO | WO 2012/020544 A1 | 2/2012 |
| WO | 2013/012901 | 1/2013 |
| WO | 2012170751 | 4/2013 |
| WO | 2013084414 | 6/2013 |
| WO | 2015005634 | 1/2015 |
| WO | 2015020811 | 2/2015 |

OTHER PUBLICATIONS

"FlashStream: A Multi-tiered Storage Architecture for Adaptive HTTP Streaming," Moonkyung Ryu, Umakishore Ramachandran, MM 2013, Oct. 21-25, 2013, Barcelona, Spain, ACM 978-1-4503-2404-5/13/10, http://dx.doi.org/10.1145/2502081.2502122.
"The Multi-streamed Solid-State Drive," Jeong-Uk Kang; Jeeseok Hyun; Hyumjoo Maeng; Sangyeun Cho, HotStorage '14—6th USENNIX Workshop on Hot Topics in Storage and File Systems, Jun. 17-18, 2014.
U.S. Appl. No. 15/090,799, filed Apr. 5, 2016.
Extended European Search Report dated Aug. 9, 2016 for EP16172142.
Kang et al., "The Multi-streamed Solid State Drive," Memory Solutions Lab, Memory Division, Samsung Electronics Co., 2014.
Wu et al., "A File System Aware FTL Design for Flash Memory Storage Systems," EDAA, 978-3-9810801-5-5, Sep. 2009.
Sun, Chao, et al., "SEA-SSD: A Storage Engine Assisted SSD With Application-Coupled Simulation Platform," IEEE Transactions on Circuits and Systems I: Regular Papers, vol. 62, Issue 1, 2015, 2 pages.
Advisory Action for U.S. Appl. No. 15/344,422 dated Aug. 10, 2018, 3 pages.
Advisory Action for U.S. Appl. No. 15/389,270 dated Jan. 21, 2020, 4 pages.
Advisory Action for U.S. Appl. No. 16/294,751 dated Feb. 24, 2020, 2 pages.
Aggarwal, C.C." Data Streams: Models and Algorithms", http://charuaggarwal.net/streambook.pdf, 2007, pp. 48-53.
Bhimani, J., et al.; "Accelerating K-Means Clustering with Parallel Implementations and GPU Computing", High Performance Extreme Computing Conference (HPEC), 2015, IEEE, 6 pages.
Final Office Action for U.S. Appl. No. 15/230,347 dated Apr. 18, 2018, 25 pages.
Final Office Action for U.S. Appl. No. 15/344,422 dated Jun. 14, 2018, 13 pages.
Final Office Action for U.S. Appl. No. 15/389,270 dated Feb. 6, 2019, 17 pages.
Final Office Action for U.S. Appl. No. 15/389,270 dated Oct. 31, 2019, 15 pages.
Final Office Action for U.S. Appl. No. 16/294,751 dated Jan. 10, 2020, 11 pages.
Megiddo, N. et al., "ARC: A Self-Tuning, Low Overhead Replacement Cache", USENIX File & Storage Technologies Conference (FAST), Mar. 31, 2003, San Francisco, CA, pp. 115-130.
Notice of Allowance for U.S. Appl. No. 15/230,347 dated Jan. 24, 2019, 14 pages.
Notice of Allowance for U.S. Appl. No. 15/344,422 dated Dec. 20, 2018, 9 pages.
Notice of Allowance for U.S. Appl. No. 15/499,877 dated Sep. 12, 2019, 5 pages.
Notice of Allowance for U.S. Appl. No. 15/499,877 dated Apr. 20, 2020, 2 pages.
Notice of Allowance for U.S. Appl. No. 16/294,751 dated Jun. 30, 2020, 8 pages.
Notice of Allowance for U.S. Appl. No. 16/676,356 dated Oct. 4, 2021, 8 pages.
Office Action for U.S. Appl. No. 15/090,799 dated Jul. 14, 2017, 18 pages.
Office Action for U.S. Appl. No. 15/230,347 dated Dec. 13, 2017, 17 pages.
Office Action for U.S. Appl. No. 15/230,347 dated Sep. 6, 2018, 19 pages.
Office Action for U.S. Appl. No. 15/344,422 dated Nov. 16, 2017, 12 pages.
Office Action for U.S. Appl. No. 15/344,422 dated Sep. 10, 2018, 15 pages.
Office Action for U.S. Appl. No. 15/389,270 dated Apr. 2, 2020, 14 pages.
Office Action for U.S. Appl. No. 15/389,270 dated Jun. 21, 2019, 19 pages.
Office Action for U.S. Appl. No. 15/389,270 dated Sep. 7, 2018, 14 pages.
Office Action for U.S. Appl. No. 15/499,877 dated Oct. 4, 2018, 13 pages.
Office Action for U.S. Appl. No. 16/294,751 dated Apr. 2, 2020, 11 pages.
Office Action for U.S. Appl. No. 16/294,751 dated Sep. 20, 2019, 10 pages.
Office Action for U.S. Appl. No. 16/676,356 dated Jun. 9, 2021, 9 pages.
Park, D., et al.; "HotDataTrap: A Sampling-based Hot Data Identification Scheme for Flash Memory", Proceedings of the 27th Annual Symposium on Applied Computing, ACM, 2012, 10 pages.
Yang, F., et al., "Multi-Streaming RocksDB", Memory Solutions Group, Samsung Research Center, August, 1, 2015, 2 pages.
Yoo, S., et al., "Block Replacement Scheme Based on Reuse Interval for Hybrid SSD System", Journal of Internet Computing and Services (JICS), vol. 16, Issue 5, Oct. 2015, pp. 19-27 (English Abstract).

* cited by examiner

DATA PROPERTY-BASED DATA PLACEMENT IN A NONVOLATILE MEMORY DEVICE

CROSS-REFERENCE TO RELATED APPLICATIONS

This application claims the benefit of provisional Patent Application Ser. No. 62/192,045, filed Jul. 13, 2015, and provisional Patent Application Ser. No. 62/245,100, filed Oct. 22, 2015, both incorporated herein by reference.

BACKGROUND

Flash memory based solid-state drives (SSD) have been used widely in both consumer computers and enterprise servers. There are two main types of flash memory, which are named after the NAND and NOR logic gates. NAND type flash memory may be written and read in blocks, each of which comprises a number of pages.

Since the NAND flash storage cells in SSDs have very unique properties, SSD's normal usages are very inefficient. For example, although it can be randomly read or programmed a page at a time, NAND flash memory can only be erased a block at a time. To rewrite a single NAND Flash page, the whole erase block (which contains a lot of flash pages) has to be erased first.

Since NAND flash based storage devices (e.g., SSDs) do not allow in-place updating, a garbage collection operation is performed when the available free block count reaches a certain threshold in order to prepare space for subsequent writes. The garbage collection includes reading valid data from the target erase block and writing the valid data to another block, while invalid data is not transferred to a new block. It takes a relatively significant amount of time to erase a NAND erase block, and each erase block has a limited number of erase cycles (from about 3K times to 10K times). Thus, garbage collection overhead is one of the biggest speed limiters in the technology class, incurring higher data I/O latency and lower I/O performance.

Therefore, operating systems (OS) and applications, which don't treat hot/cold data differently, and store them together, will see performance degradation over time (compared to OS's and applications that do treat hot and cold data differently), as well as a shorter SSD lifetime as more erase cycles are needed, causing the NAND cells to wear out faster.

SSD vendors and storage technical committees have come up with a new SSD and standard, called "multi-stream," which allows hosts to group data together in save classes called streams. Each stream is saved independently by the SSD. Data in streams can theoretically be grouped together for any reason, one such reason is for the purpose of storing similar lifetime data together in order to reduce garbage collection issues.

However, to utilize this new interface, many changes within the applications (including source code) and the OS are required. As a typical computer can have tens or hundreds of software applications installed and running, it's very difficult for all applications, especially for legacy and closed-source applications, to adapt to those changes, in order to use SSDs more efficiently. In addition, multi-stream SSD has limited applicability in that multi-stream SSD is only compatible for use by operating systems and applications that now how to use it.

What is needed is an improved data property based data placement in a storage device, and more particularly, to an autonomous process that enables computer devices to utilize data property based data placement (e.g., multi-stream) solid-state drives.

BRIEF SUMMARY

The example embodiments provide methods and systems for data property-based data placement inside a nonvolatile memory device performed by a storage controller of the nonvolatile memory device. In one aspect, the embodiments include: executing a software component on the computer device that detects at least one of an executing application and a hardware device connecting to the computing device; responsive to detecting the at least one executing application and the hardware device, searching, by the software component, a workflow repository to find a predetermined workflow associated with the at least one executing application and the hardware device, wherein the predetermined workflow associates predefined data property identifiers to different types of data items written to the nonvolatile memory device by the executing application or the hardware device; comparing, by the software component, activities of the at least one executing application and the hardware device to the predetermined workflow; and using the predetermined workflow to automatically assign the data property identifiers to the data items used by the application or the hardware device, such that the data items and assigned data property identifiers are transmitted over a channel to the nonvolatile memory device for storage wherein the nonvolatile memory device reads the data property identifiers and identifies which blocks of the nonvolatile memory device to store the corresponding data items, such that the data items having the same data property identifiers are stored in a same block.

The example embodiments also include a system, comprising: a nonvolatile memory device; and a computer device coupled to the nonvolatile memory device. The computer device executes a software component serving as an interface for enabling the computer device to utilize data property-based data placement inside the nonvolatile memory device. The software component is configured to: detect at least one of an executing application and a hardware device connecting to the computing device; responsive to detecting the at least one executing application and the hardware device, search a workflow repository to find a predetermined workflow associated with the at least one executing application and the hardware device, wherein the predetermined workflow associates predefined data property identifiers to different types of data items written to the nonvolatile memory device by the executing application or the hardware device; compare activities of the at least one executing application and the hardware device to the predetermined workflow; and use the predetermined workflow to automatically assign the data property identifiers to the data items used by the application or the hardware device, such that the data items and assigned data property identifiers are transmitted over a channel to the nonvolatile memory device for storage wherein the nonvolatile memory device reads the data property identifiers and identifies which blocks of the nonvolatile memory device to store the corresponding data items, such that the data items having the same data property identifiers are stored in a same block.

The example embodiments further include a nonvolatile memory device, comprising: a memory array; and a storage controller coupled to the memory array and to a memory channel. The storage controller is configured to: receive over the memory channel from at least one of an operating system and an executing application, a first series of data items to be stored, wherein each of the data items includes a first data property identifier that is associated with the data items based on the one or more data properties indicating data similarity, including the data lifetime, the data type, and the physical data source; receive over the memory channel from a hardware device controller a second series of data items to be stored, wherein each of the second series of data items includes a second data property identifier that is associated with the second series of data items based on one or more data properties indicating data similarity, including a data lifetime, a data type, and a physical data source; read the data property identifiers and identifying which blocks of the nonvolatile memory to store the corresponding first and second series of data items, such that the data items having the same data property identifiers are stored in a same block; and storing the data items into the identified blocks.

The example embodiments also include a method for data property-based data placement inside a nonvolatile memory device performed by a storage controller of the nonvolatile memory device. The program instructions include: receiving over a memory channel from at least one of an operating system and an executing application, a first series of data items to be stored, wherein each of the data items includes a first data property identifier that is associated with the data items based on the one or more data properties indicating data similarity, including a data lifetime, a data type, data size, logical block address (LBA) ranges, LBA access patterns, and a physical data source; receiving over the memory channel from a hardware device controller a second series of data items to be stored, wherein each of the second series of data items includes a second data property identifier that is associated with the second series of data items based on one or more data properties indicating data similarity, including a data lifetime, a data type, data size, logical block address (LBA) ranges, LBA access patterns, and a physical data source; reading the data property identifiers and identifying which blocks of the nonvolatile memory device to store the corresponding first and second series of data items, such that the data items having the same data property identifiers are stored in a same block; and storing the data items into the identified blocks.

The example embodiments may further include a method for data property-based data placement inside a nonvolatile memory device performed by a storage controller of the nonvolatile memory device. In one aspect, the embodiments may include executing a software component on the computer; querying, by the software component, a workflow repository to find a predetermined workflow associated with the software component, wherein the predetermined workflow associates predefined data property identifiers to different types of data items to be written to the nonvolatile memory device; during operation of the software component, sending one or more requests to the predetermined workflow for one or more data property identifiers to associate with data items used by the software component; and responsive to the software component receiving the one or more data property identifiers from the predetermined workflow, automatically assigning the data property identifiers to the data items used by the software component and transmitting the data items and assigned data property identifiers to the nonvolatile memory device for storage, wherein the nonvolatile memory device reads the data property identifiers and identifies which blocks of the nonvolatile memory device to store the corresponding data items, such that the data items having the same data property identifiers are stored in a same block.

BRIEF DESCRIPTION OF SEVERAL VIEWS OF THE DRAWINGS

These and/or other features and utilities of the present general inventive concept will become apparent and more readily appreciated from the following description of the embodiments, taken in conjunction with the accompanying drawings of which.

DETAILED DESCRIPTION

Figure 1:
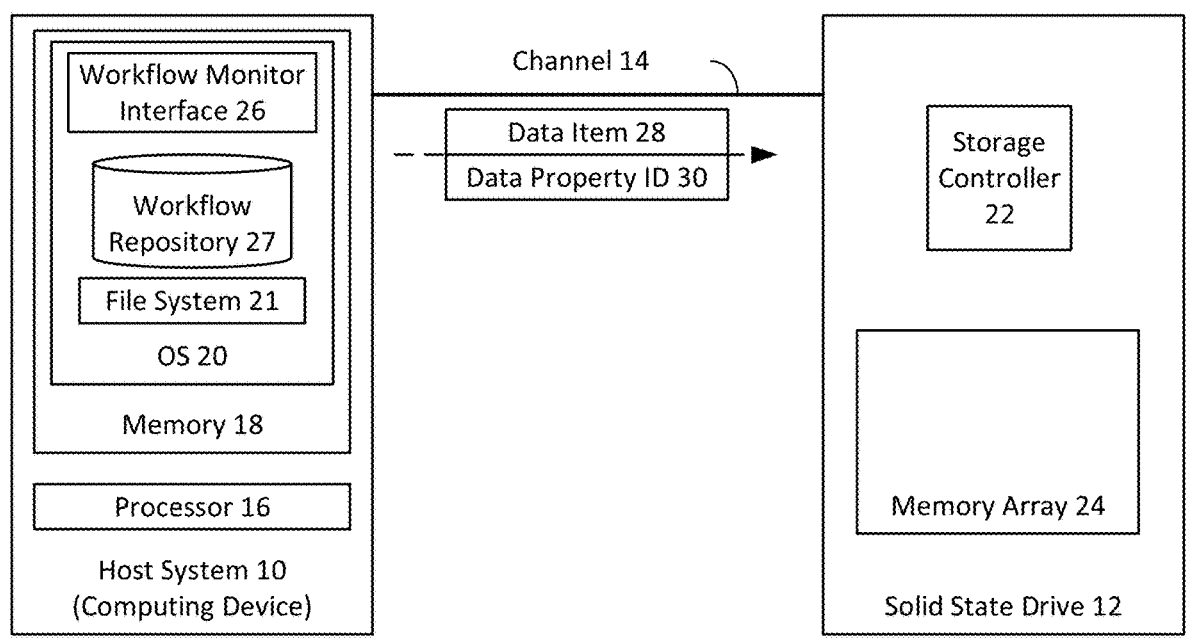
FIG. 1 is a block diagram illustrating an example embodiment of a system for data property-based data placement in a nonvolatile memory device provided by a workflow monitor interface.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Advantages and features of the present invention and methods of accomplishing the same may be understood more readily by reference to the following detailed description of embodiments and the accompanying drawings. The present general inventive concept may, however, be embodied in many different forms and should not be construed as being limited to the embodiments set forth herein. Rather, these embodiments are provided so that this disclosure will be thorough and complete and will fully convey the concept of the general inventive concept to those skilled in the art, and the present general inventive concept will only be defined by the appended claims. In the drawings, the thickness of layers and regions are exaggerated for clarity.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

The term "algorithm" or "module", as used herein, means, but is not limited to, a software or hardware component, such as a field programmable gate array (FPGA) or an application specific integrated circuit (ASIC), which performs certain tasks. An algorithm or module may advantageously be configured to reside in the addressable storage medium and configured to execute on one or more processors. Thus, an algorithm or module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for the components and components or modules may be combined into fewer components or modules or further separated into additional components and components or modules.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

In one aspect, the example embodiments provide an interface for enabling a computer device to utilize data property-based data placement (e.g., multi-streaming) inside a nonvolatile memory device, even for applications and devices not programmed to utilize muti-streaming. In particular, the example embodiments provide an application model-based stream identification process that monitors activity of the computer device and uses the knowledge of an executing application's or connected device's workflow to assign pre-determined data property identifiers to data items saved to a nonvolatile memory device. Consistent with multi-streaming, the receiving memory device can assume that all data with the same data property identifier data will be invalidated at (approximately) the same time, and place such data into common erase blocks.

FIG. 1 is a block diagram illustrating an example embodiment of a system for data property-based data placement in a nonvolatile memory device provided by a workflow monitor interface. The example embodiments described herein may be applicable to any nonvolatile memory device requiring garbage collection, and will be explained with respect to an embodiment where the nonvolatile memory device comprises a solid-state drive (SSD).

The system includes a host system 10 coupled to an SSD 12 over a channel 14. As used herein, a channel refers to any physical interface that connects to nonvolatile memory (NVM) devices (e.g., SSD) to a computer or any other hardware that uses the SSD. The interface may include wired interfaces, such as SATA, SCSI, PCIe, USB, iSCSI, FC, and Ethernet, and wireless interfaces such as Wi-Fi. As is well-known, an SSD has no moving parts to store data and does not require constant power to retain that data. Components of the host system 10 that are relevant to this disclosure include a processor 16, which executes computer instructions from a memory 18 including, an operating system (OS) 20 and a file system 21. The host system 10 may include other components (not shown), such as a memory controller for interfacing with the channel 14. The host system 10 and the SSD 12 communicate commands and data items 26 over the channel 14. In one embodiment, the host system may be a typical computer or server running any type of OS. Example types of OSs include single- and multi-user, distributed, templated, embedded, real-time, and library. In another embodiment, the system may be a stand-alone component, such as a device controller, in which case the OS may comprise a lightweight OS (or parts thereof) or even firmware.

The SSD 12 includes a storage controller 22 and a nonvolatile memory (NVM) NVM array 24 to store data from the host system 10. The storage controller 22 manages the data stored in the NVM array 24 and communicates with the host system over the channel 14 via communication protocols. The NVM array 24 may comprise any type of non-volatile random-access memory (NVRAM) including flash memory, ferroelectric RAM (F-RAM), magnetoresistive RAM (MRAM), phase-change memory (PCM), millipede memory, and the like. Both the SSD 12 and channel 14 may support multi-channel memory architectures, such as dual channel architecture; and may also support single, double or quad rate data transfers.

According to the example embodiments, in order to reduce garbage collection overhead in the SSD 12, the example embodiments provide an improved data property-based data placement in the SSD. This is accomplished by providing a workflow monitor interface 26 that enables both applications and hardware components to separately store data items in the SSD 12 that have different lifespans. In addition, use of a workflow monitor interface 26 requires no changes to user applications running on the host system 10.

In one embodiment, the workflow monitor interface 26 comprises at least one software component executed by the processor 16 that continuously monitors the host system 10 for executing applications and/or connected hardware devices. The workflow monitor interface 26 has knowledge of predetermined workflow patterns for the applications and connected devices, and assigns data property identifiers (e.g., stream IDs) to data items written by the applications and the devices based on those workflow patterns.

According to one aspect of example embodiments, the workflow monitor interface 26 may include a workflow repository 27 that acts as a library of known workflows for various applications and devices. Each of the workflows in the workflow repository 27 may have associated with it one or more streams (i.e., one or more individual data writes) produced during various stages of the workflow with a given property identifier (e.g., a stream ID). In one embodiment, the workflow repository 27 is a component separate from the workflow monitor interface 26. However, in an alternative embodiment, the workflow repository 27 may be integrated with the workflow monitor interface 26. In one embodiment, the actual assignment of the data property identifiers 30 may be performed by software hooks in the file system 21 of the OS 20.

Figure 2:
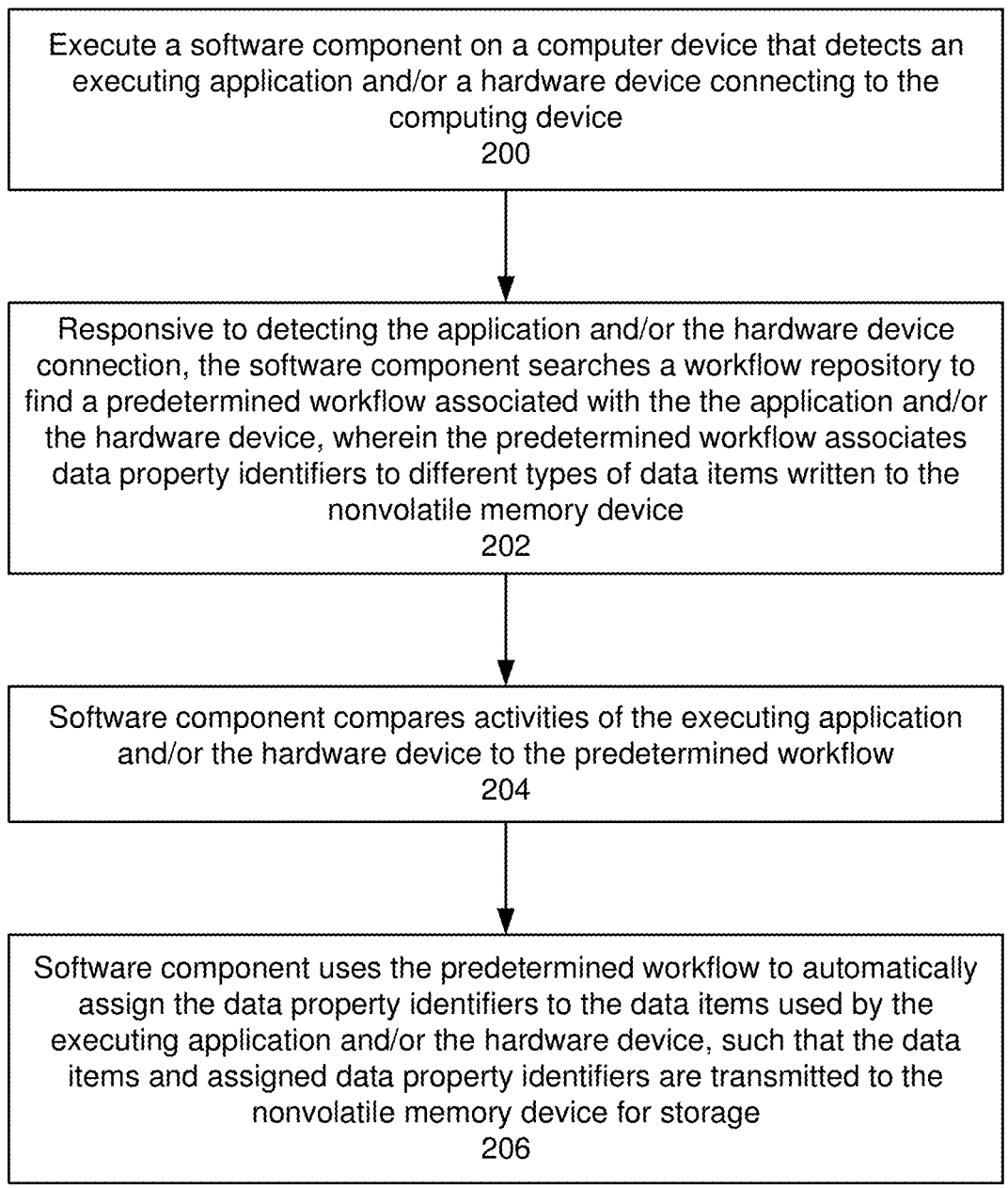
FIG. 2 is a flow diagram illustrating the process performed on the host system for providing a workflow monitor interface for enabling a computer device to utilize data property-based data placement inside a nonvolatile memory device according to one example embodiment.

FIG. 2 is a flow diagram illustrating the process performed on the host system for providing a workflow monitor interface for enabling a computer device to utilize data property-based data placement inside the nonvolatile memory device according to one example embodiment. The process may include executing a software component (e.g., the workflow monitor interface 26) on the computer device that detects at least one of an executing application and a hardware device connecting to the computing device (block 200). In one embodiment, detecting executing applications may include detecting processes and/or threads. An example of a hardware device connection may include a camera that connects and communicates to the host device 10.

In one embodiment, detecting an executing application and/or a hardware device may be referred to collectively as detecting new data placement clients, which the software component then provides with data property-based data placement (e.g., multi-streaming capability) even though the application or the hardware device were not designed with such compatibility.

Responsive to detecting the executing application and/or the hardware device connecting, the software component searches the workflow repository to find a predetermined workflow associated with the executing application and/or the hardware device, wherein the predetermined workflow associates data property identifiers to different types of data items written to the nonvolatile memory device by the executing application and/or the hardware device (block 202).

In one embodiment, the workflow repository may be integrated with the workflow monitor interface 26 or be implemented as a separate component. In one embodiment the workflow repository 27 may be located within the computing device, while in another embodiment, the workflow repository may be located remote from the computing device. In either case, in one embodiment the workflow monitor interface 26 can receive new and updated workflows for the workflow repository to accommodate new applications and hardware devices.

The software component compares activities of the executing application and/or the hardware device to the predetermined workflow (block 204). In one embodiment, comparing the activities may include examining one or more current processes or steps performed by the application and/or the hardware device and matching the current processes or steps with a similar sequence of processes or steps in the predetermined workflow. As described above, the workflow associates one or more individual data writes performed during a sequence of processes or steps during various stages of the workflow with a given data property identifier.

The software component uses the predetermined workflow to automatically assign the data property identifiers to the data items used by the executing application and/or the hardware device, such that the data items and assigned data property identifiers are transmitted to the nonvolatile memory device for storage (block 206).

According to one embodiment, the workflow monitor interface 26 uses the workflow repository 27 to associate or assign the data property identifiers 30 to each of the data items 28 based on one or more data properties indicating data similarity, such as a data lifetime, a data type, data size, and a physical or logical data source. In this manner, data items 28 having the same or similar data properties are assigned the same data property identifier value.

Because the workflow monitor interface 26 is provided at the operating system level in one embodiment, no changes are required to existing applications in order to make those applications compatible with the data property-based data placement process of the example embodiment. Accordingly, the workflow monitor interface 26 may be implemented in any type of computing device having a processor and operating system to expand use of conventional multi-streaming beyond applications and operating systems.

Figure 3:
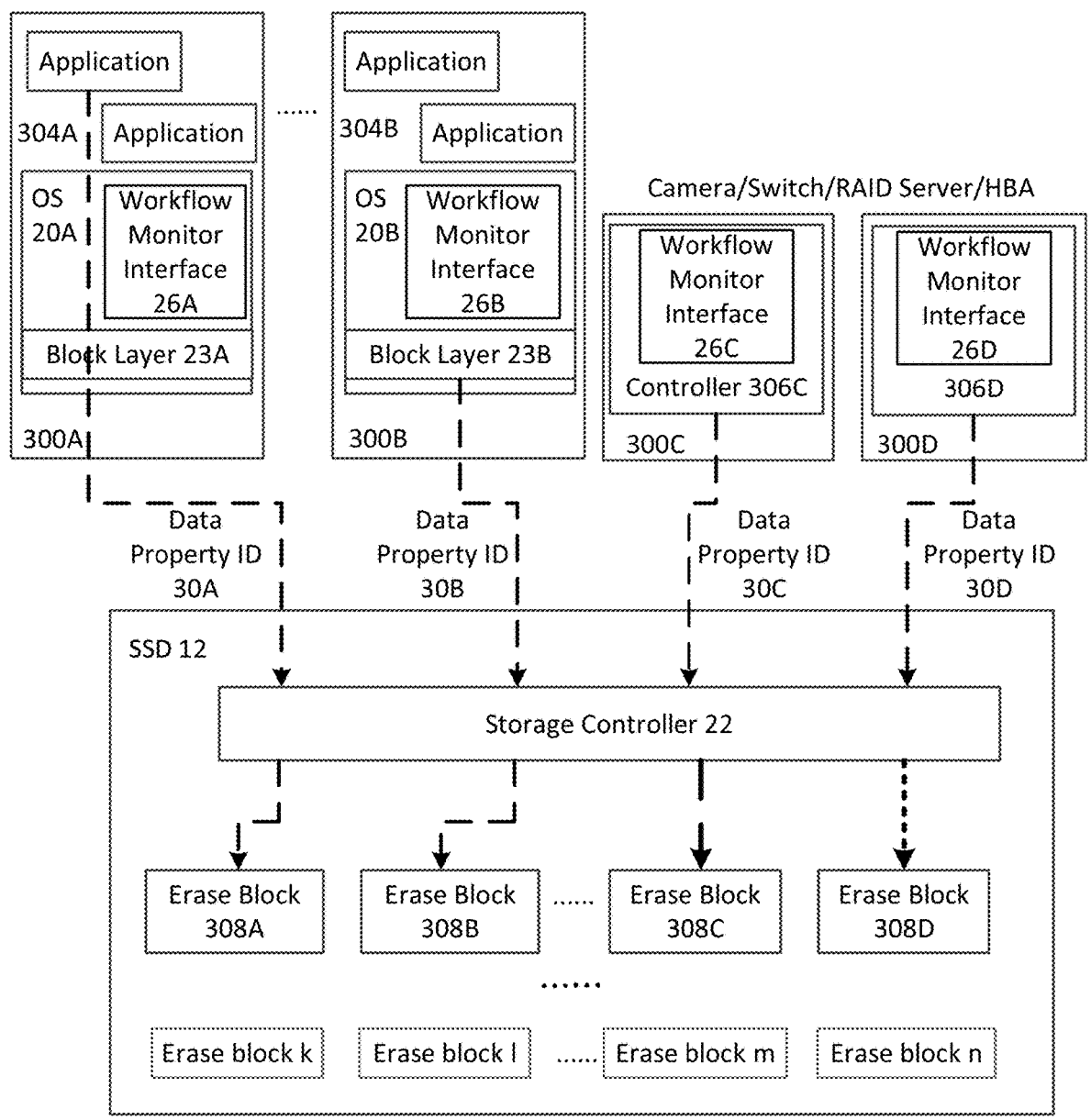
FIG. 3 is a diagram illustrating the workflow monitor interface of the example embodiments implemented in various types of computing devices, thereby making the computer devices compatible with an SSD having data property-based data placement.

FIG. 3 is a diagram illustrating the workflow monitor interface of the example embodiments implemented in various types of computing devices 300A-300D, thereby making the computer devices compatible with an SSD 12 having data property-based data placement (e.g., multi-streaming). Computing devices 300A and 300B may represent host devices such as a PC or server or storage subsystem in which respective workflow monitor interfaces 26A and 26B are provided within operating systems 20A and 20B or optionally as a standalone application. The workflow monitor interface 26A monitors data item operations performed by an application 304A, and automatically assigns data property identifiers 30A to each of the data items from application 304A based on a matching workflow from the workflow repository. Similarly, the workflow monitor interface 26B monitors data item operations performed by a block layer 23B of the OS 20B, and automatically assigns data property identifiers 30B to each of the data items operated on by the block layer 23B based on a matching workflow from the workflow repository.

Computing devices 300C and 300D may represent any type of hardware device that utilizes a nonvolatile memory device, including a camera, a microphone, a thermometer, a GPS, a clock, a sensor, a switch, a router, a RAID system, or a host bus adapter (HBA) system. For certain types of hardware devices, the workflow monitor interfaces 26C may be provided within a hardware device controller 306C. The workflow monitor interface 26C automatically assigns data property identifiers 30C to data item operations (e.g. a write) from the device controller 306C based on a known workflow. For other types of devices 300D, such as a camera, the workflow monitor interface 26D may be implemented as part of the OS or run as a separate application on a processor. The workflow monitor interface 26D monitors data item operations performed by a processor 306D, and automatically assigns data property identifiers 30D to each of the data items from the processor 306D based on a known or matching workflow from the workflow repository.

Figure 4:
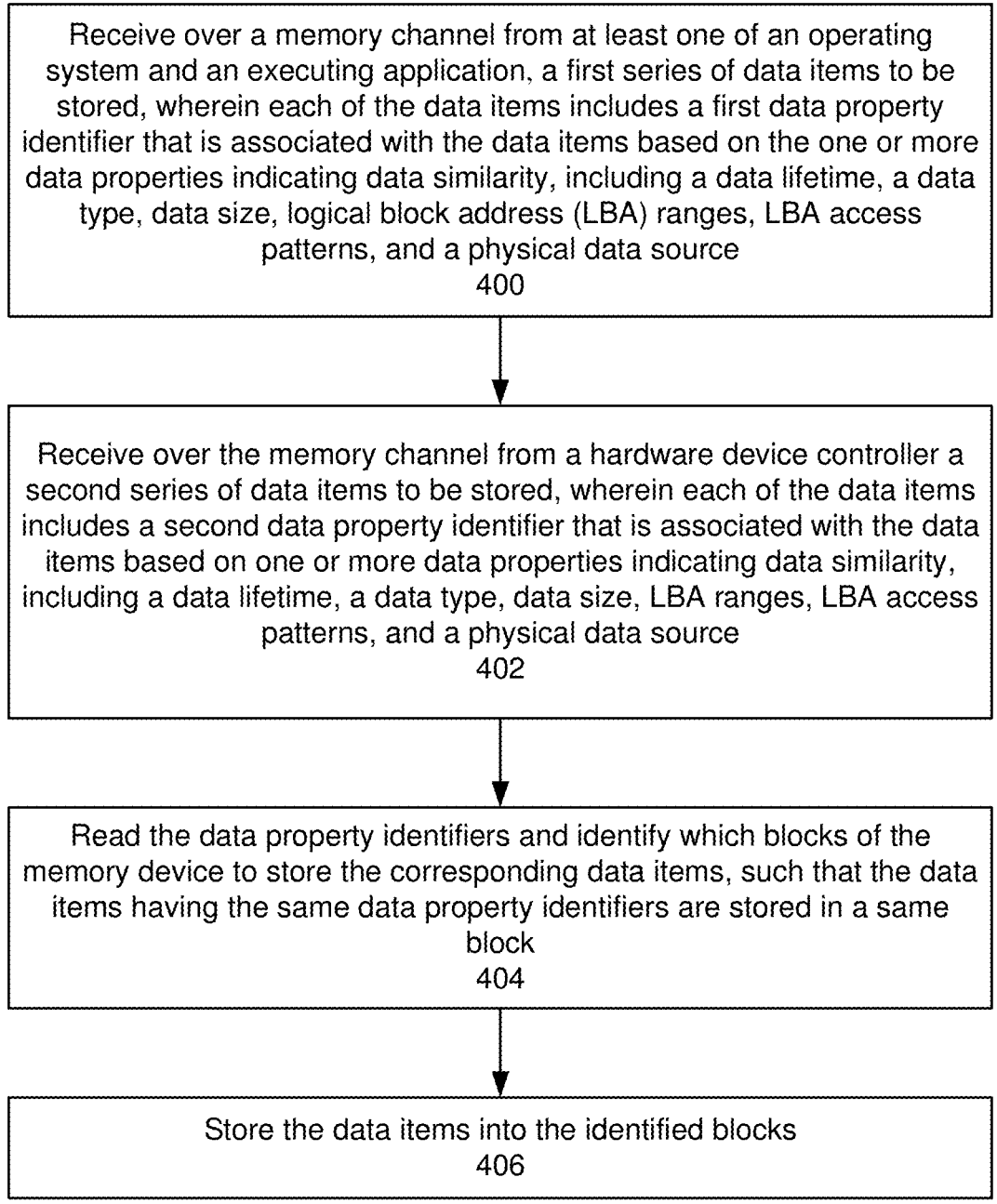
FIG. 4 is a flow diagram illustrating a process for data property-based data placement performed by the storage controller of the nonvolatile memory device according to an example embodiment.

FIG. 4 is a flow diagram illustrating a process for data property-based data placement performed by the storage controller of the nonvolatile memory device according to an example embodiment. Referring to both FIGS. 3 and 4, the process may include receiving over a channel from at least one of an operating system or an executing application (e.g., OS 20B or apps 304A), a first series of data items to be stored, wherein each of the data items includes a first data property identifier that is associated with the data items based on the one or more data properties indicating data similarity, which may include a data lifetime, a data type, data size, logical block address (LBA) ranges, LBA access patterns, and a physical data source (block 400). It should be noted that many types of data properties such as data lifetime, a data type, data size, logical block address (LBA) ranges, LBA access patterns, and a physical data source may be considered for assessing similarity, including data properties not listed here or which are currently not known.

In one embodiment, the data type may include properties outside of the application of origin. In one embodiment, the data items received from the operating system or the application may include data property identifiers that are associated with the data items by another process besides the workflow monitor interface 26.

The storage controller receives over the channel from a hardware device (e.g., controller 306C or processor 306D) another series of data items to be stored, wherein each of the data items includes a second data property identifier that is associated with the data items based on one or more of the data properties indicating data similarity, (block 402).

The storage controller reads the data property identifiers and identifies which blocks of the memory device to store the corresponding data items, such that the data items having the same data property identifiers are stored in a same set of blocks (block 404), and stores the data items into the identified blocks (block 406).

For example, with respect to FIG. 3, the storage controller 22 of the SSD 12 receives the data items from the computing devices 300A and 300B that have been assigned data property ID 30A and 30B, respectively. The storage controller 22 then stores data items associated with data property ID 30A within the same erase block(s) 308A, and stores data items associated with data property ID 30B within the same erase block(s) 308B. Similarly, the storage controller 22 of the SSD 12 receives the data items from the device controllers 306C and 306D of computing devices 300C and 300D that have been assigned data property ID 30C and 30D, respectively. The storage controller 22 then stores data items associated with data property ID 30C within the same erase block(s) 308C, and stores data items associated with data property ID 30D within the same erase block(s) 308D. Note, in one embodiment erase blocks 308C and 308D need not be mutually exclusive sets of blocks, if the data identifiers indicate that the data between sources is actually similar.

According to the workflow monitor interface 26 of some example embodiments, a data property ID 30 may be assigned to the data items 28 that are output from any type input device for storage. For example, assume the workflow monitor interface 26 is implemented within a digital security camera that takes an image periodically, e.g., once a second. The workflow monitor interface 26 may assign a data property ID 30 to each image file based on data properties indicating data similarity, such as the capture rate of the images, the image file size, and the origin of the images (e.g., device ID and/or GPS location). Note that such data properties need not be associated with a particular application or file system as is the metadata used by conventional multi-streaming.

Figure 5:
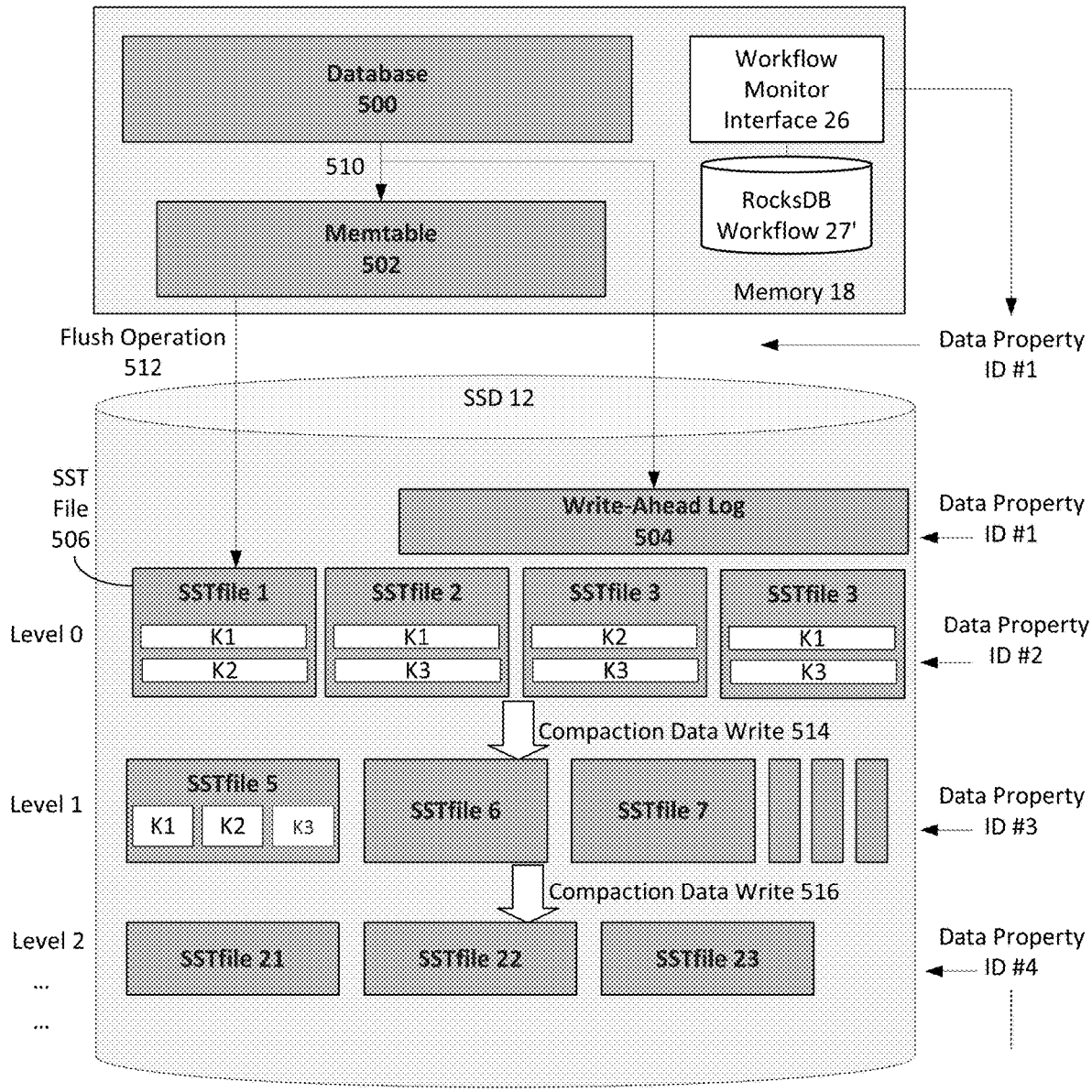
FIG. 5 is a block diagram illustrating an example of the operation of the workflow monitor interface with respect to storage operations performed by a database application that stores data having different lifetimes and different properties.

As a further example, FIG. 5 is a block diagram illustrating an example of the operation of the workflow monitor interface 26 with respect to storage operations performed by a database application that stores data having different lifetimes and different properties. In one embodiment, the database may refer to RocksDB™, which is an embeddable persistent key-value store for fast storage. RocksDB is a fork of LevelDB™ which has been optimized to take advantage of many CPU cores and make efficient use of fast storage, such as solid-state drives (SSD), for IO bound workloads. In operation, a data file (e.g., a SST file) with a sorted set of key-value pairs is written sequentially to a first-level file. During a write operation, instead of modifying the files, changes are collected in memory for a time, and then written as a second-level file with the changes. For more changes, yet another level can be added.

When the workflow monitor interface 26 detects that the RocksDB has started-up, the workflow monitor interface 26 may retrieve and use a RocksDB workflow 27' associated with the RocksDB application to assign distinct data property identifiers to data manipulated by the RocksDB. The RocksDB workflow 27' may comprise a tree workflow, such as an LSM Tree workflow. The RocksDB is one example implementation of an LSM Tree workflow; others may include BigTable, Apache HBase, LevelDB, WiredTiger, Apache Cassandra, Riak, SQLite4, and Cockroachdb.

The database 500 and the workflow monitor interface 26 and the RocksDB workflow 27' are shown in memory 18 of the host system. The database 500 makes use of a memtable 502 stored in memory 18. Within the SSD 12, the database 500 makes use of a write ahead log 504 and various SST files 506 (e.g., SST file 1, SST file 2 . . . SST file n) stored on different levels (e.g., level 0, level 1 . . . level m).

When the database 500 performs a write operation 510, the database stores the data in a structure in the memtable 502, and also appends the write to the write-ahead log 504. The write ahead log 504 receives every write, which survives permanently even after power failure. The workflow monitor interface 26 monitors the write operation 510 and may assign data property identifier #1 to the log files based on the RocksDB workflow 27'.

The memtable 502 stores writes until the contents of the memtable 502 reach a configurable threshold, at which point a flush operation 512 is performed to flush the writes to an SST file 506 in the SSD 12. Data in the write ahead log 504 may be purged after the corresponding data in the memtable 502 is flushed to an SST file 506. SST files 506 are typically not written to again after the memtable 502 is flushed. The workflow monitor interface 26 monitors the flush operation 512 and may assign data property identifier #2 to the level 0 SST files 506 based on the RocksDB workflow 27'.

As inserts/updates occur, instead of overwriting the rows, the database 500 may write a new timestamped version of the inserted or updated data in another SST file 506. The database 500 manages the accumulation of SST files 506 on the SSD 12 using compaction. Once the data stored at level 0 reaches a data threshold, the database 500 performs a compaction operation 514 to compress the database file by removing deleted data, columns, and rows, created during updates, and consolidating the valid data from the level 0 the SST files into new SST files stored on level 1. The database 500 uses the new consolidated SST files instead of multiple old SST files, enabling read request to be fulfilled more efficiently than before compaction. The old SST files are deleted as soon as any pending reads finish using the files. The workflow monitor interface 26 monitors the compaction operation 514 and may assign data property identifier #3 to the level 1 SST files 506 based on the RocksDB workflow 27'.

Once the data stored at level 1 reaches a data threshold, the database 500 performs a compaction operation 516 that removes unused data and consolidates the valid data from the level 1 SST files into new SST files stored on level 2. The workflow monitor interface 26 monitors the compaction operation 516 and may assign data property identifier #4 to the level 2 SST files 506 based on the RocksDB workflow 27', and so on. This example illustrates that according to the present invention, one application can have multiple streams for a single type of file.

According to an example embodiment, data property identifiers are assigned to the data based on expected lifetimes groupings (in this case, to SST levels) and the data may be stored in the SSD based on these expected lifetimes. It is unknown when the data will be invalidated or deleted, but the workflow monitor interface 26 assumes that the data having the same data property identifiers will be invalidated at or around the same time.

Figure 6:
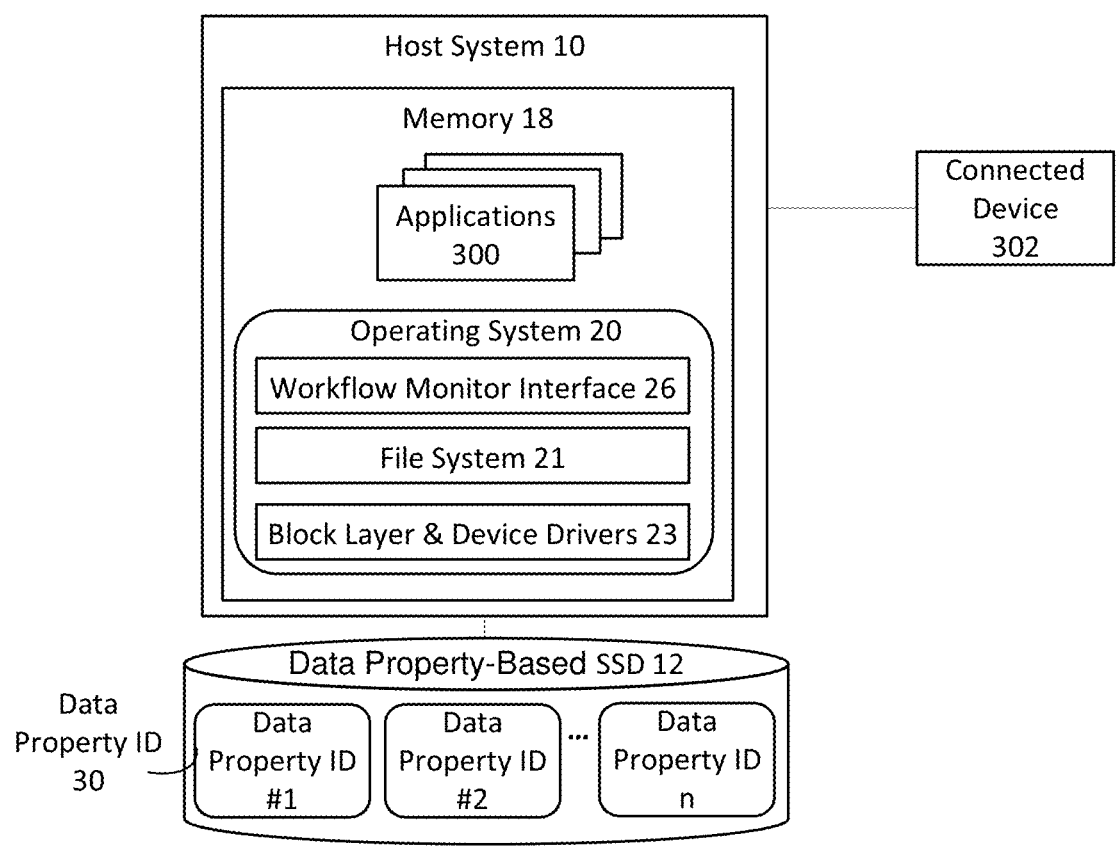
FIG. 6 is a block diagram illustrating the workflow monitor interface in further detail.

FIG. 6 is a block diagram illustrating the workflow monitor interface, which is one example of identifier assignment method, in further detail. Similar to FIGS. 1 and 3, the workflow monitor interface 26 is shown provided at the operating system 20 level of the host system 10. The workflow monitor interface 26 monitors the operations of the applications 300, the file system 21, and block layer 23, device drivers, and connected devices and assigns data property identifiers 30 to data items based on the corresponding workflow 27'. The SSD 12 reads the data property identifiers 30 and identifies which blocks of the SSD 12 are used to store the corresponding data items so that the data items having the same data property identifiers 30 are stored in a same block.

According to some example embodiments, the workflow monitor interface 26 may continuously run in the background to monitor the start-up of applications 300 and connected devices 302. In one embodiment, the workflow monitor interface 26 may maintain a database (not shown) of data item modifications to the SSD 12. The workflow monitor interface 26 may monitor file update operations performed by an applications/device and automatically assign a data property ID 30 to each of the file update operations according to the workflow 27'.

The workflow monitor interface 26 may include a component that utilizes system call hooks at the file system level to monitor file update operations (create/write/update/delete) made to the files by the applications 300, the OS 20, and/or the connected device 302. Most operating systems, such as Windows and Linux, provide file system hooks for system programming purposes. The workflow monitor interface 26 may look up the file update operation (or a sequence of such operations) in the workflow 27' to find the predetermined data property ID assigned to that operation.

The workflow monitor interface 26 may then assign the predetermined data property identifier 30 to the update operation. In on embodiment, the workflow 27' may assign file creations or fresh file writes data property IDs 30 according to the file's type or any other characteristic of the data. Finally, the workflow monitor interface 26 may forward the actual file writes to the underlying file system 21.

As an example of the data property ID assignments, assume the following: a user is editing a photo app to edit a photo file named foo.jpg (a JPEG file type); and the SSD of the user's computer is configured to handle up to four data property IDs or stream IDs. When the user saves the photo onto the SSD 12, the workflow monitor interface 26 monitors and looks up the file save request in the workflow 27' associated with the photo app. The workflow 27' specifies which of the four data property IDs should be assigned to the save request, e.g. a "1".

The workflow monitor interface 26 assigns the data property ID of 1 as specified in the workflow and that data property ID is then sent with the file data through the file system 21 and block layer 23 to the SSD 12 for storage in a block that stores other data having an assigned data property ID of 1.

In an alternative embodiment, the workflow monitor interface 26 and workflow repository 27' may be implemented within the OS block storage layer 23 or even inside the SSD 12.

Figure 7:
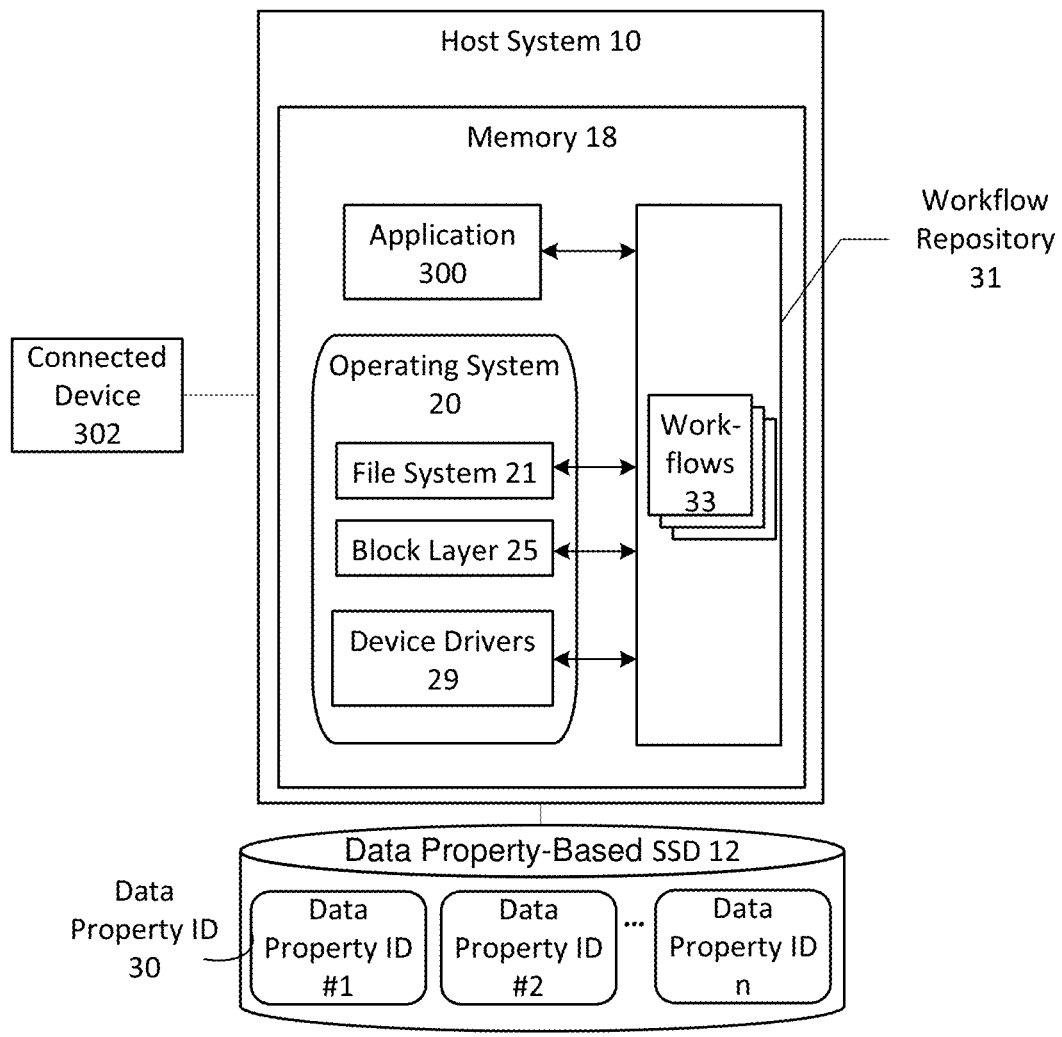
FIG. 7 is a block diagram illustrating another embodiment of a data identifier assignment method.

FIG. 7 is a block diagram illustrating another embodiment of a data identifier assignment method. Instead of providing a separate workflow monitor interface 26 (FIG. 6) that assigns data property identifiers, the present embodiment makes the workflow repository 27 storing known workflows and data placement settings directly assessable to executing software components, such as applications 300, various layers of operating system 20 (e.g., file system 21, block layer 25 and device drivers 29), and software embedded in connected devices 302. The workflow repository 31 may store one or more predetermined workflows 33 that associate predefined data property identifiers to different types of data items to be written to the nonvolatile memory device during activities/functions performed by the software components.

The various software components can themselves query the workflow repository 31 and obtain information on what data property IDs 30 to use. Thus, for example, a software component may 1) identify itself to the workflow repository 31, 2) obtain data property 30 IDs to use for various functions, and 3) assign the data property IDs 30 to data items.

In contrast to the workflow monitor embodiment that monitors existing component operations and automatically applies the data property IDs, the present embodiment relies on a request/response mechanism with the workflow repository 31 so that the already existing components can add multi-streaming capability. The workflow monitor embodiment requires very little reprogramming of existing software components, but does require additional work to be done in creating and running the workflow monitor software. The present embodiment requires slight reprogramming of existing software components, but dispenses with the need to create, run, and maintain a workflow monitor.

In further detail of the present embodiment, a software component may query the workflow repository 31 itself to find a predetermined workflow 33 associated with the software component. In one embodiment, the query may include an identification of the software component. The response from the workflow repository 31 may include the identity of the workflow 33 assigned to the software component.

During operation, the software component may send one or more requests to the identified workflow 33 for one or more data property identifiers to associate with data items used by the software component. In one embodiment, the request may include a current operation to be performed by the software component and one or more attributes of the current operation which will be performed (e.g. data type). In one embodiment, the software component may make query identifying the software component to the workflow repository 31 using an identifier (e.g., name or some form of ID) of the software component, followed by a second query for data property identifiers associated with the software component from the identified workflow 33. In another embodiment, the software component may make a single query that includes the identity of the software component along with the request for the data property identifiers.

Rather than query workflow repository 31 using a name or ID as would an application, in the embodiment where the software component comprises an operating system (OS), each level of the operating system could provide input to the workflow repository 31 that is relevant to the corresponding operating system level in order to obtain one or more data property identifiers. For example, at the file system level, the OS could use a file type, size, etc. when querying for data property identifiers. At the block level, the OS could use LBA ranges and the like. In further embodiment, the OS could use device IDs from attached devices to obtain data property identifiers from the workflow repository 31.

In response to a query from the software component, the workflow 33 returns to the software component one or more data property IDs as specified in the workflow 33 for that operation and the type of data item.

Responsive to receiving the data property IDs from the workflow 33, the software component may automatically assign the data property IDs to the data items used by the software component, and transmit the data items and assigned data property identifiers to the nonvolatile memory device (e.g. SSD 12) for storage.

The SSD 12 reads the data property IDs 30 and identifies which blocks of the SSD 12 are used to store the corresponding data items so that the data items having the same data property IDs 30 are stored in a same block.

As an example of the data property ID assignments, assume the following: a user is editing a photo app to edit a photo file named foo.jpg (a JPEG file type); and the SSD of the user's computer is configured to handle up to four data property IDs or stream IDs. When the user saves the photo onto the SSD 12, the photo app may send a request to the workflow 27' associated with the photo app for the data property ID assigned to a file save operation. The workflow 27' specifies which of the four data property IDs should be assigned to the save operation, e.g. a "1".

The photo app assigns the data property ID of 1 as specified in the workflow and that data property ID is then sent with the file data through the file system 21 and block layer 23 to the SSD 12 for storage in a block that stores other data having an assigned data property ID of 1.

In one embodiment, the workflow repository 31 may be implemented as a database application.

In one embodiment, the workflow monitor interface 26 is implemented as a software component. In another embodiment, the workflow monitor interface 26 could be implemented as a combination of hardware and software. Although the workflow monitor interface 26 is shown as a single component, the functionality of the workflow monitor interface 26 may be implemented using a greater number of modules/components.

The workflow monitor interface 26 of the example embodiments may be applied to a broad range of storage markets from client to enterprise, which could be applied to a disk for a single standalone machine (such as desktop, laptop, workstation, server, and the like), storage array, software-define storage (SDS), application-specific storage, virtual machine (VM), virtual desktop infrastructure (VDI), content distribution network (CDN), and the like.

In one embodiment, for example, the NVM array 24 of the SSD 12 may be formed of a plurality of non-volatile memory chips, i.e., a plurality of flash memories. As another example, the NVM array 24 may be formed of different-type non-volatile memory chips (e.g., PRAM, FRAM, MRAM, etc.) instead of flash memory chips. Alternatively, the NVM array 24 can be formed of volatile memories, i.e., DRAM or SRAM, and may have a hybrid type where two or more types of memories are mixed.

A methods and systems for data property-based data placement in a storage device, and a workflow monitor interface for enabling computer systems to utilize the data placement method has been disclosed. The present invention has been described in accordance with the embodiments shown, and there could be variations to the embodiments, and any variations would be within the spirit and scope of the present invention. For example, the exemplary embodiment can be implemented using hardware, software, a computer readable medium containing program instructions, or a combination thereof. Software written according to the present invention is to be either stored in some form of computer-readable medium such as a memory, a hard disk, or a CD/DVD-ROM and is to be executed by a processor. Accordingly, many modifications may be made by one of ordinary skill in the art without departing from the spirit and scope of the appended claims.

We claim:

1. A method for providing an interface for enabling a computer device to utilize data property-based data placement inside a nonvolatile memory device, the method comprising:
   executing a software component on the computer device that detects at least one of an executing application and a hardware device connecting to the computer device;
   responsive to detecting the at least one of the executing application and the hardware device, searching, by the software component, a workflow repository to find a predetermined workflow associated with the at least one of the executing application and the hardware device, wherein the predetermined workflow associates predefined data property identifiers to different types of data items written to the nonvolatile memory device by the at least one of the executing application and the hardware device, the predetermined workflow including at least one of a known pattern of processes and a known pattern of steps performed by the at least one of the executing application and the hardware device, the pattern of known processes includes different processes and the pattern of known steps includes different steps, the different processes and the different steps including a plurality of data item update operations for the nonvolatile memory device;
   comparing, by the software component, activities of the at least one of the executing application and the hardware device to the predetermined workflow; and
   using the predetermined workflow to automatically assign the data property identifiers to the data items used by the at least one of the executing application and the hardware device, such that the data items and assigned data property identifiers are transmitted over a channel to the nonvolatile memory device for storage, wherein the nonvolatile memory device reads the data property identifiers and identifies which blocks of the nonvolatile memory device to store the corresponding data items, such that the data items having the same data property identifiers are stored in a same block.

2. The method of claim 1, wherein the hardware device comprises at least one of: a camera, a microphone, a thermometer, a GPS, a clock, a sensor, a switch, a router, a RAID system, or a host bus adapter (HBA) system.

3. The method of claim 1, wherein detecting the at least one of the executing application and the hardware device comprises detecting new data placement clients, which the software component then provides with data property-based data placement even though the at least one of the executing application and the hardware device were not designed with such capability.

4. The method of claim 1, wherein the software component comprises a workflow monitor interface for enabling the computer device to utilize data property-based data placement of the nonvolatile memory device.

5. The method of claim 4, further comprising: the workflow monitor interface receiving new and updated workflows for the workflow repository to accommodate new applications and hardware devices.

6. The method of claim 5, wherein comparing activities of the at least one of the executing application and the hardware device to the predetermined workflow is performed by:
   examining one or more current processes or steps performed by the at least one of an application and a hardware device and matching the current processes or steps with at least a portion of the known pattern of processes or steps in the predetermined workflow.

7. A system, comprising: a nonvolatile memory device; and
   a computer device coupled to the nonvolatile memory device, the computer device executing a software component serving as an interface for enabling the computer device to utilize data property-based data placement inside the nonvolatile memory device, the software component configured to:
   detect at least one of an executing application and a hardware device connecting to the computer device;

responsive to detecting the at least one of the executing application and the hardware device, search a workflow repository to find a predetermined workflow associated with the at least one of the executing application and the hardware device, wherein the predetermined workflow associates predefined data property identifiers to different types of data items written to the nonvolatile memory device by the at least one of the executing application and the hardware device, the predetermined workflow including at least one of a known pattern of processes and a known pattern of steps performed by the at least one of the executing application and the hardware device, the known pattern of processes including different processes and the known pattern of steps including different steps, the different processes and the different steps including a plurality of data item update operations for the nonvolatile memory device;

compare activities of the at least one of the executing application and the hardware device to the predetermined workflow; and use the predetermined workflow to automatically assign the data property identifiers to the data items used by the at least one of the executing application and the hardware device, such that the data items and assigned data property identifiers are transmitted over a channel to the nonvolatile memory device for storage, wherein the nonvolatile memory device reads the data property identifiers and identifies which blocks of the nonvolatile memory device to store the corresponding data items, such that the data items having the same data property identifiers are stored in a same block.

8. The system of claim 7, wherein the hardware device comprises at least one of: a camera, a microphone, a thermometer, a GPS, a clock a sensor, a switch, a router, a RAID system, or a host bus adapter (HBA) system.

9. The system of claim 7, wherein detection of the at least one of the executing application and the hardware device comprises detecting new data placement clients, which the software component then provides with data property-based data placement even though the at least one application and hardware device were not designed with such capability.

10. The system of claim 7, wherein the software component comprises a workflow monitor interface for enabling the computer device to utilize data property-based data placement of the nonvolatile memory device.

11. The system of claim 10, wherein a workflow monitor interface receives new and updated workflows for the workflow repository to accommodate new applications and hardware devices.

12. The system of claim 11, wherein the workflow monitor interface compares activities of the at least one of the executing application and the hardware device to the predetermined workflow by:

examining one or more current processes or steps performed by the at least one of an application and a hardware device and matching the current processes or steps with at least a portion of the known pattern of processes or steps in the predetermined workflow.

13. A nonvolatile memory device, comprising: a memory array; and a storage controller coupled to the memory array and to a memory channel, the storage controller configured to:

receive over the memory channel from at least one of an operating system and an executing application, a first series of data items to be stored, wherein each of the data items includes a first data property identifier that is associated with the data items based on one or more data properties indicating data similarity based on a first predetermined workflow for the executing application, the first predetermined workflow including at least one of a first known pattern of processes and a first known pattern of steps performed by the executing application, the first known pattern of processes including different processes and the known pattern of steps including different steps, the different processes and the different steps including a plurality of data item update operations for the nonvolatile memory device;

receive over the memory channel from a hardware device controller a second series of data items to be stored, wherein each of the second series of data items includes a second data property identifier that is associated with the secondseries of data items based on the one or more data properties indicating data similarity, the data similarity being based on a second predetermined workflow for the hardware device, the second predetermined workflow including at least one of a second known pattern of processes and a second known pattern of steps performed by the hardware device;

read the data property identifiers and identifying which blocks of the nonvolatile memory device to store the corresponding first and second series of data items, such that the data items having the same data property identifiers are stored in a same block; and store the data items into the identified blocks.

14. The nonvolatile memory device of claim 13, wherein the hardware device comprises at least one of: camera, a microphone, a thermometer, a GPS, a clock, a sensor, a switch, a router, a RAID system, or a host bus adapter (HBA) system.

15. The nonvolatile memory device of claim 13, wherein the at least one of the operating system and the executing application or the hardware device controller are part of a computer device.

16. The nonvolatile memory device of claim 15, wherein the computer device includes a workflow monitor interface for enabling the computer device to utilize data property-based data placement of the nonvolatile memory device.

17. The nonvolatile memory device of claim 16, wherein the workflow monitor interface executes at an operating system level in the computer device and is configured to:

detect at least one of the executing application and a hardware controller connecting to the computer device;

responsive to detecting the at least one of the executing application and the hardware controller, search a workflow repository to find a predetermined workflow associated with the at least one of the executing application and the hardware controller, the predetermined workflow including at least one of the first predetermined workflow and the second predetermined workflow, wherein the predetermined workflow associates predefined data property identifiers to different types of data items written to the nonvolatile memory device by the at least one of the executing application and the hardware controller;

compare activities of the at least one of the executing application and the hardware device to the predetermined workflow; and use the predetermined workflow to automatically assign the data property identifiers to the data items used by the at least one of the executing application and the hardware device, such that the data items and assigned data property identifiers are transmitted over a channel to the nonvolatile memory device for storage.

18. A method for data property-based data placement inside a nonvolatile memory device performed by a storage controller of the nonvolatile memory device, the method comprising:

receiving over a memory channel from at least one of an operating system and an executing application, a first series of data items to be stored, wherein each of the data items includes a first data property identifier that is associated with the data items based on one or more data properties indicating data similarity based on a first predetermined workflow for the executing application, the first predetermined workflow including at least one of a first known pattern of processes and a first known pattern of steps performed by the executing application, the first known pattern of processes including different processes and the known pattern of steps including different steps, the different processes and the different steps including a plurality of data item update operations for the nonvolatile memory device;

receiving over the memory channel from a hardware device controller a second series of data items to be stored, wherein each of the second series of data items includes a second data property identifier that is associated with the second series of data items based on the one or more data properties indicating data similarity based on a second predetermined workflow for the hardware device, the second predetermined workflow including at least one of a second known pattern of processes and a second known pattern of steps performed by the hardware device;

reading the data property identifiers and identifying which blocks of the nonvolatile memory device to store the corresponding first and second series of data items, such that the data items having the same data property identifiers are stored in a same block; and storing the data items into the identified blocks.

19. The method of claim 18, wherein the hardware device comprises at least one of: camera, a microphone, a thermometer, a GPS, a clock, a sensor, a switch, a router, a RAID system, or a host bus adapter (HBA) system.

20. The method of claim 18, wherein the at least one of the operating system and the executing application or the hardware device controller are part of a computer device.

21. The method of claim 20, wherein the computer device includes a workflow monitor interface for enabling the computer device to utilize data property-based data placement of the nonvolatile memory device.

22. The method of claim 21, wherein the workflow monitor interface executes at an operating system level in the computer device and is configured to:

detect at least one of the executing application and a hardware controller connecting to the computer device;

responsive to detecting the at least one of the executing application and the hardware controller, search a workflow repository to find a predetermined workflow associated with the at least one of the executing application and the hardware controller, the predetermined workflow including at least one of the first predetermined workflow and the second predetermined workflow, wherein the predetermined workflow associates predefined data property identifiers to different types of data items written to the nonvolatile memory device by the at least one of the executing application and the hardware controller;

compare activities of the at least one of the executing application and the hardware device to the predetermined workflow; and use the predetermined workflow to automatically assign the data property identifiers to the data items used by the executing application or the hardware device, such that the data items and assigned data property identifiers are transmitted over a channel to the nonvolatile memory device for storage.

23. A method for providing an interface for enabling a computer device to utilize data property-based data placement inside a nonvolatile memory device, the method comprising:

executing a software component on the computer device;

querying, by the software component, a workflow repository to find a predetermined workflow associated with the software component, wherein the predetermined workflow associates predefined data property identifiers to different classes of data items to be written to the nonvolatile memory device, the predetermined workflow including at least one of a known pattern of processes and a known pattern of steps performed by the software component, the known pattern of processes including different processes and the known pattern of steps including different steps, the different processes and the different steps including a plurality of data item update operations for the nonvolatile memory device;

during operation of the software component, sending one or more requests to the workflow repository for one or more data property identifiers to associate with data items used by the software component; and responsive to the software component receiving the one or more data property identifiers from the predetermined workflow, automatically assigning the data property identifiers to the data items used by the software component and transmitting the data items and assigned data property identifiers to the nonvolatile memory device for storage, wherein the nonvolatile memory device reads the data property identifiers and identifies which blocks of the nonvolatile memory device to store the corresponding data items, such that the data items having the same data property identifiers are stored in a same block.

* * * * *